(12) United States Patent
Hattig

(10) Patent No.: US 9,310,871 B2
(45) Date of Patent: *Apr. 12, 2016

(54) POWER MANAGEMENT OF PERIODIC TRANSMISSIONS FROM NETWORKING APPLICATIONS

(75) Inventor: Myron Hattig, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,897

(22) Filed: Jul. 17, 2012

(65) Prior Publication Data

US 2012/0281608 A1 Nov. 8, 2012

Related U.S. Application Data

(63) Continuation of application No. 11/824,500, filed on Jun. 29, 2007, now Pat. No. 8,223,678.

(51) Int. Cl.
*H04W 52/02* (2009.01)
*G06F 1/32* (2006.01)

(52) U.S. Cl.
CPC .................................. *G06F 1/3203* (2013.01)

(58) Field of Classification Search
CPC .. H04W 52/02; H04W 52/0203; H04W 84/12
See application file for complete search history.

(56) References Cited

U.S. PATENT DOCUMENTS

| | | | |
|---|---|---|---|
| 5,862,452 A * | 1/1999 | Cudak et al. .................. 725/81 |
| 6,252,868 B1 * | 6/2001 | Diachina et al. ............. 370/347 |
| 6,381,218 B1 * | 4/2002 | McIntyre et al. ............. 370/245 |
| 6,421,746 B1 * | 7/2002 | Sheikh et al. .................. 710/48 |
| 6,467,008 B1 * | 10/2002 | Gentry et al. ................ 710/261 |
| 6,694,149 B1 | 2/2004 | Ady et al. |
| 7,489,993 B2 * | 2/2009 | Coffee et al. ................ 701/32.3 |
| 2002/0041570 A1 * | 4/2002 | Ptasinski et al. ............. 370/252 |
| 2002/0061012 A1 * | 5/2002 | Thi et al. ....................... 370/352 |
| 2002/0132603 A1 * | 9/2002 | Lindskog et al. ............. 455/343 |
| 2003/0206564 A1 * | 11/2003 | Mills et al. .................... 370/528 |
| 2004/0095904 A1 * | 5/2004 | Laroia et al. .................. 370/329 |
| 2004/0109432 A1 * | 6/2004 | Laroia et al. .................. 370/343 |
| 2004/0203696 A1 * | 10/2004 | Jijina et al. .................... 455/420 |
| 2005/0003781 A1 | 1/2005 | Kunz et al. |
| 2005/0025182 A1 * | 2/2005 | Nazari .......................... 370/469 |
| 2006/0120369 A1 * | 6/2006 | Chandran et al. ............. 370/390 |
| 2008/0144493 A1 * | 6/2008 | Yeh ................................ 370/230 |
| 2008/0291830 A1 * | 11/2008 | Pernu et al. ................... 370/236 |
| 2008/0291856 A1 * | 11/2008 | Li et al. ......................... 370/311 |
| 2009/0088924 A1 * | 4/2009 | Coffee et al. ................... 701/33 |
| 2010/0115308 A1 * | 5/2010 | Iino et al. ...................... 713/320 |
| 2011/0013626 A1 | 1/2011 | Ko et al. |
| 2011/0013926 A1 * | 1/2011 | Yonehara ........................ 399/94 |

OTHER PUBLICATIONS

Office Action Received for U.S. Appl. No. 11/824,500, mailed on Jul. 7, 2010, 10 pages.

(Continued)

*Primary Examiner* — Hassan Phillips
*Assistant Examiner* — Prenell Jones
(74) *Attorney, Agent, or Firm* — Alpine Technology Law Group LLC

(57) ABSTRACT

Methods and apparatus relating to power management of periodic transmissions from networking applications are described. In one embodiment, a periodic transmission manager logic coupled between one or more network applications and one or more network interfaces may control the flow of periodic transmissions from the one or more network applications to the one or more network interfaces. Other embodiments are also disclosed.

18 Claims, 4 Drawing Sheets

(56) References Cited

OTHER PUBLICATIONS

Office Action Received for U.S. Appl. No. 11/824,500, mailed on Feb. 23, 2011, 13 pages.

Office Action Received for U.S. Appl. No. 11/824,500, mailed on Oct. 12, 2011, 11 pages.

Notice of Allowance Received for U.S. Appl. No. 11/824,500, mailed on Mar. 14, 2012, 7 pages.

* cited by examiner

POWER MANAGEMENT OF PERIODIC TRANSMISSIONS FROM NETWORKING APPLICATIONS

RELATED APPLICATION

The present application is a continuation of U.S. patent application Ser. No. 11/824,500, filed on Jun. 29, 2007, entitled "POWER MANAGEMENT OF PERIODIC TRANSMISSIONS FROM NETWORKING APPLICATIONS", issued as U.S. Pat. No. 8,223,678, which is hereby incorporated herein by reference in its entirety and for all purposes.

BACKGROUND

The present disclosure generally relates to the field of electronics. More particularly, an embodiment of the invention generally relates to power management of periodic transmissions from networking applications.

Portable computing devices are quickly gaining popularity in part due to their size. Since most portable computing devices rely on batteries to operate, efficient use of battery power can become a critical operating issue. For example, inefficient use of power in a portable computing device (e.g., due to periodic transmissions from some networking applications) may shorten the period during which the device may be used by a user. Also, inefficient power usage may result in heat generation which may, in turn, damage the electronic components of a computing device.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein may enable power management of periodic transmissions from networking applications. In particular, networking applications may generate periodic transmissions in some current implementations, resulting in power consumption. For example, different applications within a device may wake irrespective of when other applications wake to send periodic messages. To address this and other issues, in some embodiments, periodic transmissions by one or more network applications may be coordinated (for transmission in a burst, for example) to conserve power in a computing device, including for example a device that relies on battery power to operate. However, the embodiments discussed herein are not limited to computing devices that rely on battery power and may be applied in any computing device to conserve power.

Moreover, some current applications sending periodic network packets may not coordinate their wake events. This can cause power to be consumed during the following events, for example: (1) the operating system (OS) suspend/resume of an application, (2) the OS suspend/resume of a network interface, (3) the network application running, (4) the network interface driver running, and/or (5) the network interface hardware and/or embedded software sending packets.

In accordance with some embodiments, power savings may be realized based on one or more of the following: (A) reduction of the number of OS application suspend/resume actions (e.g., an embodiment may combine these events based on a defined policy of how frequently a system wakes); (B) reduction of the number of OS network interface suspend/resume actions (e.g., an embodiment may combine these events based on a defined policy of how frequently a system wakes); and/or (C) reduction of the run time of network applications.

Figure 1:
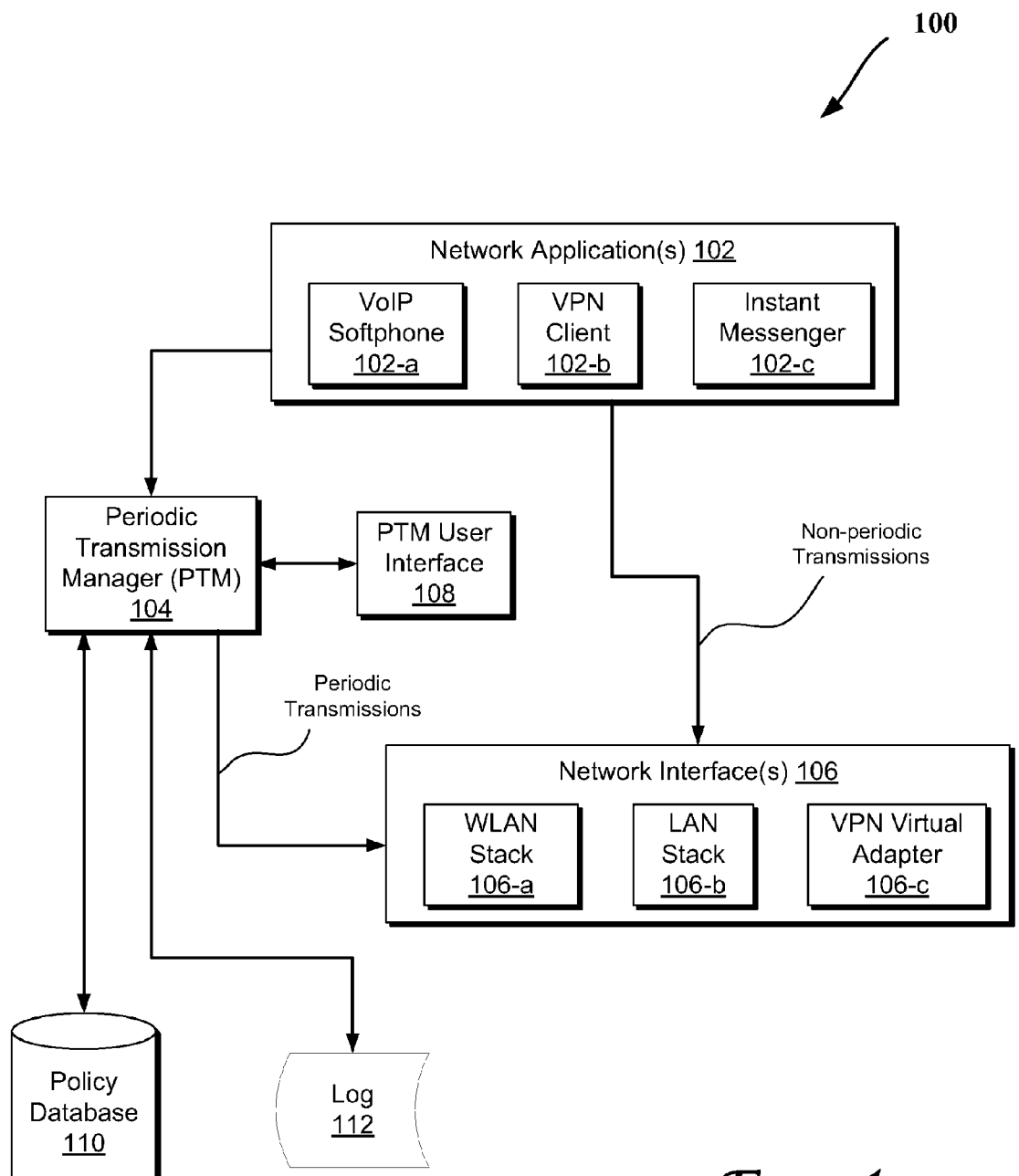
FIG. 1 illustrates a block diagram of a periodic transmission manager system, according to an embodiment.

FIG. 1 illustrates a block diagram of a periodic transmission manager (PTM) system 100, according to an embodiment. The system 100 may include one or more network applications 102 (e.g., including one or more of: a voice over Internet Protocol (VoIP) application/software operated phone 102-a, a virtual private networking (VPN) client 102-b, an instant messenger 102-c, etc.), a PTM logic 104, and/or one or more network interfaces 106 (e.g., including one or more of: a WLAN (Wireless Local Area Network) stack 106-a, a LAN (Local Area Network) stack 106-b, a VPN virtual adapter 106-c, etc.).

As shown in FIG. 1, the PTM logic 104 may be coupled to a PTM user interface (UI) 108, e.g., to allow manipulation of various operations performed by the PTM logic 104 by a user. Also, the PTM logic 104 may be coupled to a policy database 110 (e.g., to provide access to policy information that may indicate how frequently a system is to wake) and/or a log 112 (e.g., which may store information regarding occurrence of various events relating to the operations of the PTM logic 104). In one embodiment, as illustrated in FIG. 1, transmissions by the network application(s) 102 that are non-periodic may be directly passed to the corresponding network interface(s) 106 (e.g., via a communication link, which may directly couple applications 102 and interfaces 106 in an embodiment). Periodic transmissions may, however, be passed from the network application(s) 102 to the corresponding network interface(s) 106 via the PTM logic 104. As such, the PTM logic 104 may coordinate periodic network-related transmissions in a computing device, e.g., to conserve power.

In one embodiment, the PTM logic 104 may be implemented as a background task or network application; thus, it may consume power when it executes in an embodiment. Moreover, in one embodiment, an instance of the PTM logic 104 may be designed with power efficiency in mind unlike some general-purpose network applications. In an embodiment, a packet corresponding to a periodic transmission from a network application (e.g., applications(s) 102) to a network interface (e.g., interface(s) 106) may be received. Policy data (e.g., stored in the database 110) may used to determine whether the packet is to be held for a time period. The packet may be transmitted to the network interface in response to a determination (e.g., by the PTM 104) that the packet is to be transmitted to the network interface. In one embodiment, the determination that the packet is to be transmitted to the network interface may be based on an expiration of the time period. Additionally, non-periodic transmissions generated by the network application may be directly transmitted to the network interface in an embodiment.

Furthermore, some of the embodiments discussed herein may be applied to various periodic network application transmissions, including but not limited to, virtual private network (VPN) keep-a-lives to keep an idle VPN connection from being disconnected and a session initiation protocol (SIP) client-to-server keep-alive so the SIP server knows the SIP client is available for a voice over Internet protocol (VoIP) call or instant message query. Paging and location applications might also utilize some embodiments discussed herein. Examples of network services that may use some of the embodiments include: a DHCP (Dynamic Host Configuration Protocol) client registering a DHCP renew request, or a supplicant registering a request to re-authentication (e.g., in compliance with Institute of Electrical & Electronics Engineers (IEEE) 802.1x specification, June 2004) with an authentication server (e.g., in compliance with the aforementioned IEEE 802.1x specification). Hence, some embodiments may reduce power consumption associated with DHCP renews and 802.1x re-authentication, which may also make wake-on-wireless LAN (local area network) more robust in some embodiments.

Figure 2:
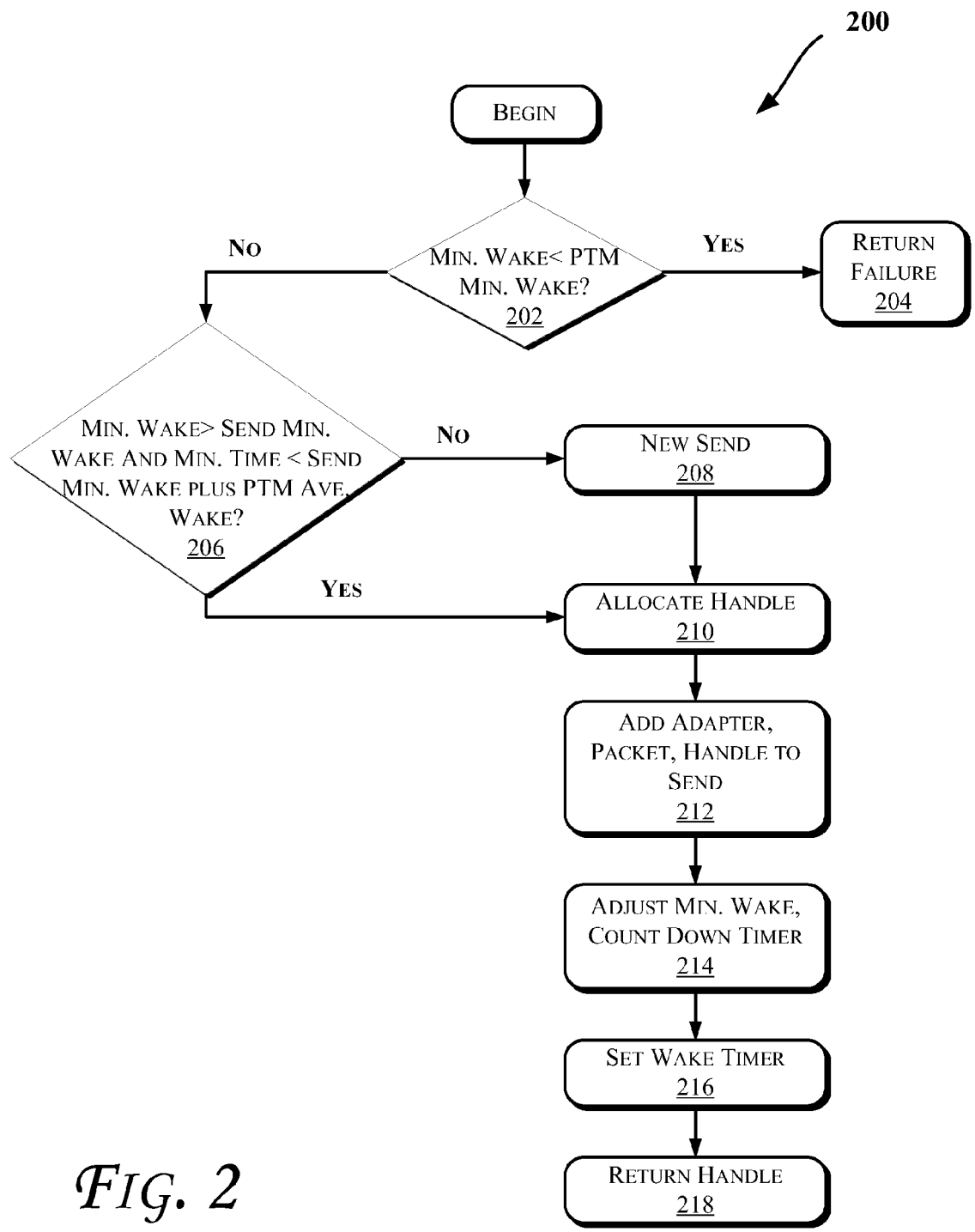
FIGS. 2-4 illustrate flow diagrams of methods according to some embodiments.
Figure 3:
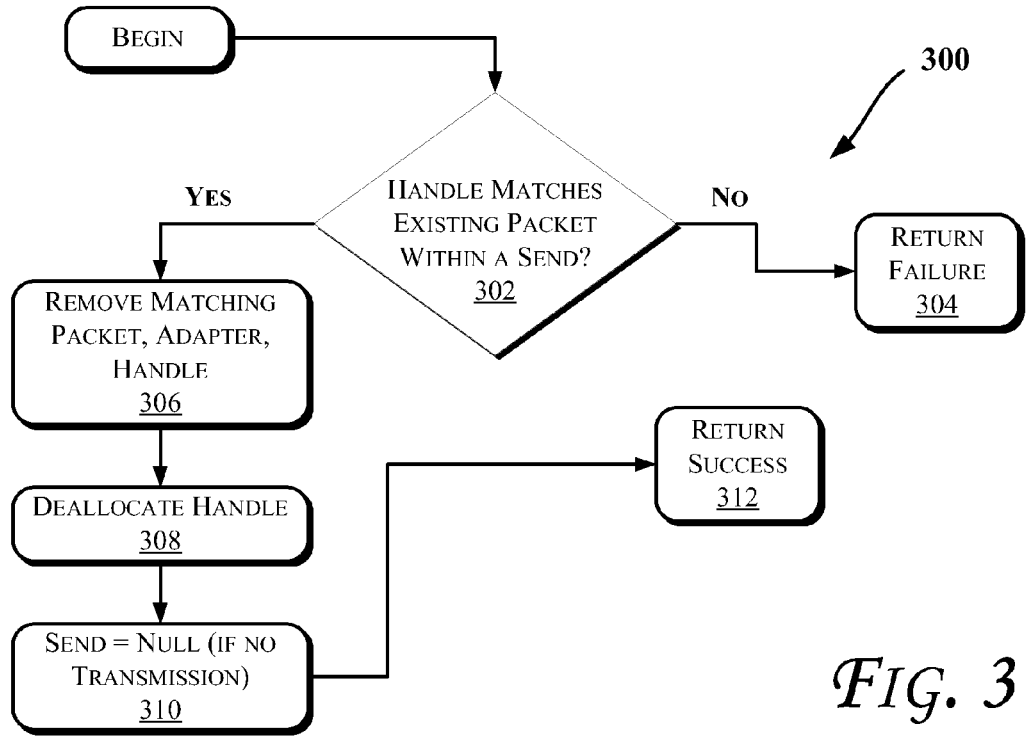

In some embodiments, a service may be utilized to implement one or more methods. In an embodiment, an instance of the service may be implemented as software or firmware. Alternatively, the service may be implemented as logic, including hardware circuitry, and/or combinations of software, firmware, and/or hardware. FIGS. 2 and 3 below discuss embodiments of two methods (which may be triggered through an API called by network applications 102 of FIG. 1 to PTM) referred to as PTM Register and PTM UnRegister, respectively. Another method (e.g., discussed with reference to FIG. 4) may be performed internal to PTM logic 104 (e.g., not triggered by the API call) which is referred to herein as "Send" in some embodiments. Various components of FIGS. 1 and 5 may be used to perform the operations discussed herein, including the operations discussed with reference to FIGS. 2-4.

Additionally, in some embodiments, the following configuration parameters may be set: (1) PTMMinWake in some time unit (e.g., milli seconds or seconds); and/or (2) PTMAverageWake in some time unit. Examples of setting configuration parameters may include, but are not limited to: (1) user sets parameters via a UI (e.g., UI 108 of FIG. 1); (2) device administrator (e.g., corporate information technology, wireless provider, etc.) sets parameters in an area protected from users (e.g., file registry); and/or (3) device manufacturer may set parameters in an area protected from device administrator (e.g., in EEPROM (Electronically Erasable Programmable Read Only Memory)).

In accordance with some embodiments, the variables and data structures discussed herein (e.g., using C constructs) may be as follows:

(a) Send[ ] may be an array of structures. The structures may consist of MinWake, CountDownTimer, and/or a link list of PacketInfo structure.

(b) PacketInfo structure may contain Adapter, Packet, and/or Handle.

Furthermore, each Send[ ] entry may correlate to a wake time. Also, each PacketInfo entry may correlate to a packet to be sent. Multiple packets may be sent for each wake period in some embodiments. Further, when no packets for a particular Send[ ] exist, the Send[ ] entry may be null.

The following pseudo code illustrates an instance of the application programming interfaces (APIs) which may be used in some embodiments to trigger the PTM Register and PTM UnRegister operations discussed herein.

```
Handle    RegisterPeriodicTransmission(
    XmtNetworkInterface=WLAN, LAN, VPN Virtual Adapter;
    MinWakePeriod(Milliseconds);
    PeriodPacketBuffer)
ReturnStatus UnRegisterPeriodTransmission(
    RegisterationHandle=ReturnValue from
RegisterPeriodicTransmission)
```

In one embodiment, if an instance of the above APIs is operating on an ultra mobile PC (UMPC) using, e.g., the Microsoft Vista® operating system, then PeriodicPacketBuffer may be a layer 3 (IP) packet that can be sent in its entirety over a layer 2 (Ethernet LAN, IEEE 802.11 WLAN) network interface. In the case of the VPN virtual adapter, the virtual adapter may encrypt this packet, then send it over an appropriate network interface, just as it may with all layer 3 packets.

FIG. 2 illustrates a flow diagram of a PTM "Register" method 200, according to an embodiment. At an operation 202, it may be determined whether the minimum wake time (e.g., of one of the network application 102 of FIG. 1) is less than a minimum wake time set in a PTM (e.g., the PTM logic 104 of FIG. 1). If operation 202 returns an affirmative, failure may be returned at operation 204. Otherwise, an operation 206 may determine whether the minimum wake time is greater than the MinWake of a Send[i] and whether the minimum time is less than MinWake of the Send[i] plus average wake time observed or stored by the PTM (e.g., the PTM logic 104 of FIG. 1). In one embodiment, the operation 206 may be used to determine if this new packet send that is being registered might be grouped with other existing sends, or if a new group of sends need to be created. The minimum required timing may a determining factor for this in an embodiment.

As shown in FIG. 2, if operation 206 returns a negative response, at operation 208, a new Send[i] entry may be created. At operation 210, a handle may be allocated. At operation 212 information including for example corresponding adapter, packet, and/or handle may be added to the Send[i]. At operation 214, the corresponding MinWake and countdown timer (e.g., implemented in the PTM logic 104 in one embodiment) may be adjusted if the new send occurs earlier than the existing sends. At operation 216, a wake time may be set (e.g., within the PTM logic 104 in one embodiment). The method 200 terminates at operation 218 by returning the handle.

FIG. 3 illustrates a flow diagram of a PTM "UnRegister" method 300, according to an embodiment. In one embodiment, method 300 may be triggered by an UnRegisterPeriodicTransmission(Handle) call. Referring to FIG. 3, at an operation 302, it may be determined whether the handle matches an existing packet within a Send[ ] transmission. If not, an operation 304 returns failure. Otherwise, at operation 306 matching packet, adapter, and/or handle may be removed. At an operation 308, the handle may be deallocated. At operation 310, the corresponding send[i] may be set to null (if there are no packets). Method 300 may then terminate at operation 312.

Figure 4:
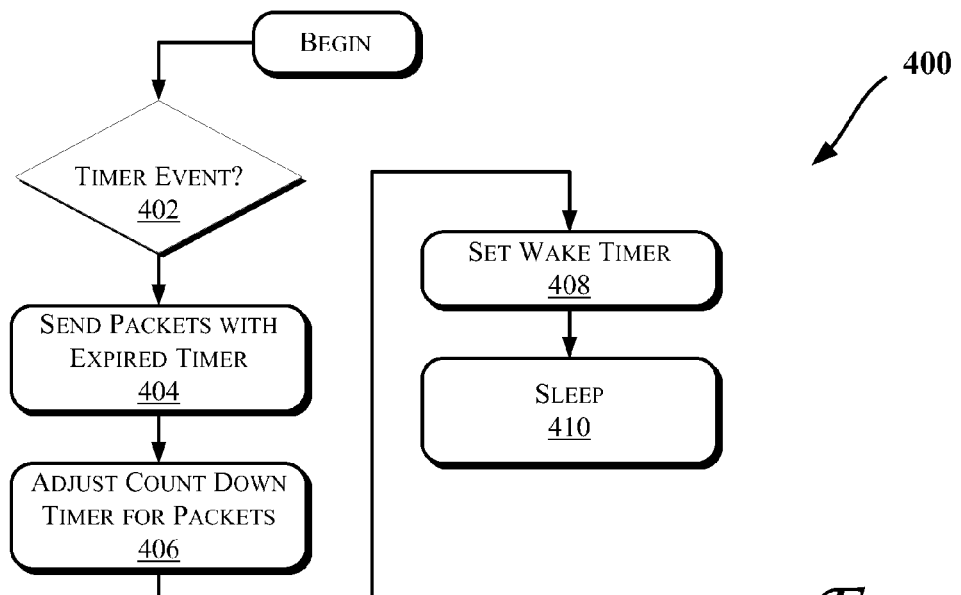

FIG. 4 illustrates a flow diagram of a PTM "Send" method 400, according to an embodiment. Upon occurrence of a timer event at operation 402, one or more packets with expired timers may be sent at operation 404. At operation 406, the countdown timer may be adjusted (e.g., for all packets), as discussed with reference to operation 214 of FIG. 2, for example. At an operation 408, the wake timer may be set and a sleep mode may be assumed at operation 410.

Moreover, the techniques discussed herein may be applied for various computing system components, such as the components discussed with reference to the system of FIG. 5. For example, one or more of each of the network applications 102, database 110, log 112, UI 108, and/or network interfaces 106 of FIG. 1 may be stored in the memories discussed with reference to FIG. 5 to control the operations and/or power consumption levels of network interface device(s) 530 as discussed with reference to FIGS. 1-4. Also, the PTM logic 104 may be stored as a software routine in the aforementioned memories, or implemented in hardware present in the system 500 (such as within the chipset 506 and/or network interface device(s) 530). Of course, depending on the embodiments, each of the components discussed with reference to FIG. 1 may be present in different locations within FIG. 5.

Figure 5:
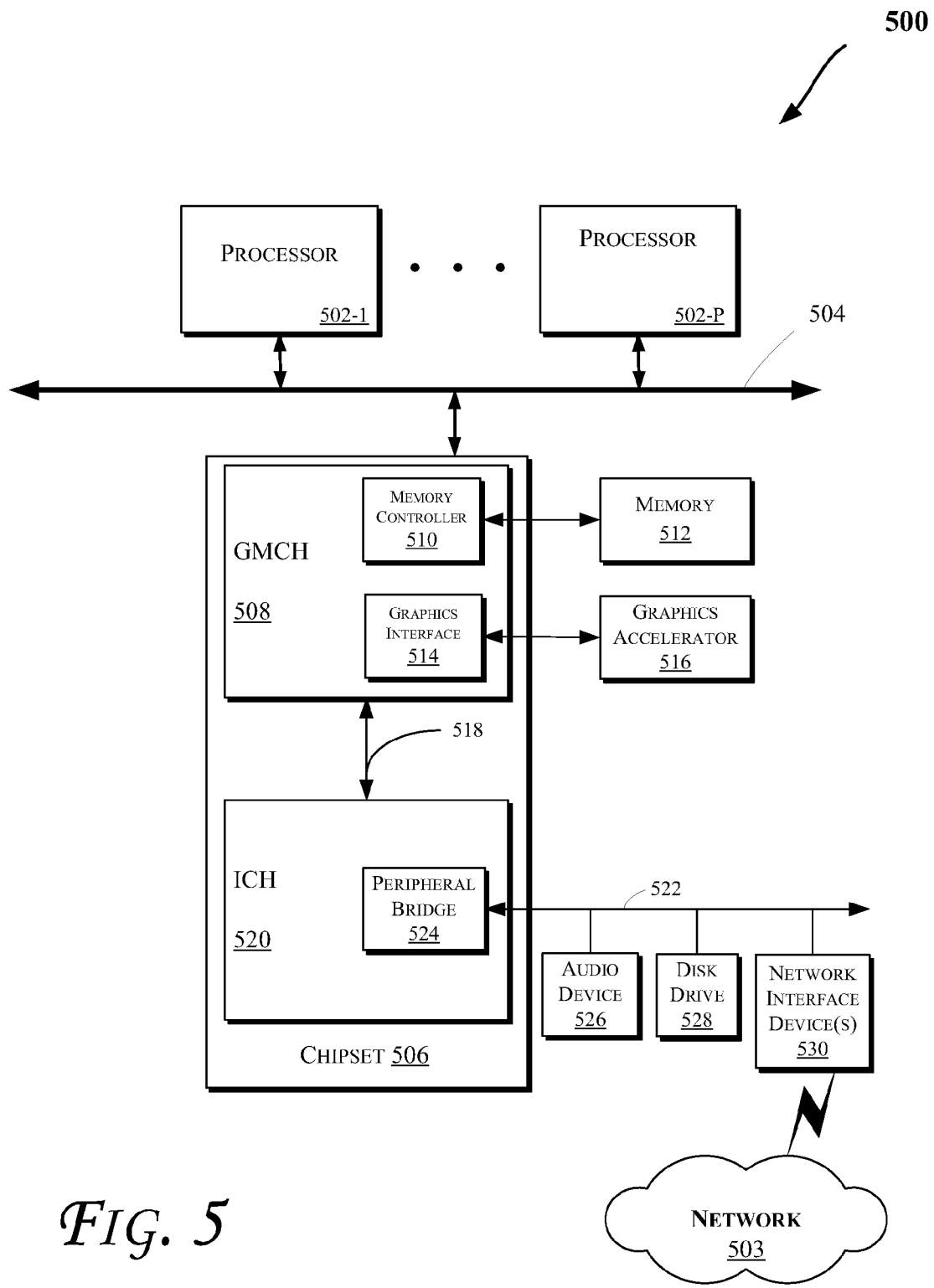
FIG. 5 illustrates a block diagram of an embodiment of a computing system, which may be utilized to implement some embodiments discussed herein.

More particularly, FIG. 5 illustrates a block diagram of a computing system 500 in accordance with an embodiment of the invention. The computing system 500 may include one or more central processing unit(s) (CPUs) or processors 502-1 through 502-P (which may be referred to herein as "processors 502" or "processor 502"). The processors 502 may communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, the operations discussed with reference to FIGS. 1-4 may be performed by one or more components of the system 500.

A chipset 506 may also communicate with the interconnection network 504. The chipset 506 may include a graphics memory control hub (GMCH) 508. The GMCH 508 may include a memory controller 510 that communicates with a memory 512. The memory 512 may store data, including sequences of instructions that are executed by the processor 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a graphics accelerator 516. In one embodiment of the invention, the graphics interface 514 may communicate with the graphics accelerator 516 via an accelerated graphics port (AGP). In an embodiment of the invention, a display (such as a flat panel display, a cathode ray tube (CRT), a projection screen, etc.) may communicate with the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the processor 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and one or more network interface device(s) 530 (which is in communication with the computer network 503). Other devices may communicate via the bus 522. Also, various components (such as the network interface device 530) may communicate with the GMCH 508 in some embodiments of the invention. In addition, the processor 502 and the GMCH 508 may be combined to form a single chip. Furthermore, the graphics accelerator 516 may be included within the GMCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 500 may be arranged in a point-to-point (PtP) configuration. For example, processors, memory, and/or input/output devices may be interconnected by a number of point-to-point interfaces.

In various embodiments of the invention, the operations discussed herein, e.g., with reference to FIGS. 1-5, may be implemented as hardware (e.g., logic circuitry), software, firmware, or any combinations thereof, which may be provided as a computer program product, e.g., including a machine-readable or computer-readable medium having stored thereon instructions (or software procedures) used to program a computer (e.g., including a processor) to perform a process discussed herein. The machine-readable medium may include a storage device such as those discussed with respect to FIG. 1 or 5.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
    periodic transmission manager logic, the period transmission manager logic at least partially comprising hardware logic, coupled between one or more applications and one or more network interfaces, to control a power state of the one or more network interfaces; and
    the periodic transmission manager logic coupled to a storage unit, wherein the storage unit is to store policy data and wherein the periodic transmission manager logic is to determine, based on the policy data, when periodic transmissions generated by the one or more applications are to be transmitted to the one or more network interfaces to cause a suspend action or a resume action in the one or more network interfaces, wherein the periodic transmission manager logic is to combine a plurality of wake events, to be caused by the period transmissions, to coordinate transmission of the periodic transmissions, generated by the one or more applications, in a burst to conserve power.

2. The apparatus of claim 1, further comprising a communication link to directly transmit non-periodic transmissions generated by the one or more applications to the one or more network interfaces.

3. The apparatus of claim 1, wherein the storage unit is to store data corresponding to one or more of: the one or more applications or the one or more network interfaces.

4. The apparatus of claim 1, wherein the one or more applications comprise one or more of: a voice over Internet Protocol application, a virtual private networking application, or an instant messenger.

5. The apparatus of claim 1, wherein the one or more network interfaces comprise one or more of: a local area network stack, a wireless local area network stack, or a virtual private networking virtual adapter.

6. The apparatus of claim 1, further comprising a processor coupled to the storage unit.

7. The apparatus of claim 6, wherein the processor is to comprise a plurality of processor cores.

8. A method comprising:
    determining, at periodic transmission manager logic, whether a packet, corresponding to a periodic transmission from an application to a network interface, is to be held for a time period based on stored policy data in a storage unit;
    transmitting the packet to the network interface in response to a determination that the packet is to be transmitted to the network interface to cause a suspend action or a resume action in the network interface; and
    the periodic transmission manager logic combining a plurality of wake events, to be caused by the period transmissions, to coordinate transmission of periodic transmissions, generated by one or more applications, in a burst to conserve power.

9. The method of claim 8, wherein the determination that the packet is to be transmitted to the network interface is based on an expiration of the time period.

10. The method of claim 8, further comprising storing the policy data in storage unit.

11. The method of claim 8, further comprising directly transmitting non-periodic transmissions generated by the application to the network interface.

12. The method of claim 8, further comprising adjusting a timer to indicate when the transmitting the packet to the network interface is to occur.

13. The method of claim 12, wherein adjusting the timer comprises one or more of: adjusting a wake timer or adjusting a count down timer.

14. The apparatus of claim 1, wherein the one or more applications are to comprise one or more of: a voice over Internet Protocol application, a virtual private networking application, or an instant messenger.

15. The method of claim 8, wherein the application is to comprise one or more of: a voice over Internet Protocol application or an instant messenger.

16. The method of claim 8, wherein the network interface is to comprise one or more of: a local area network stack, a virtual private networking virtual adapter, or a wireless local area network stack.

17. The apparatus of claim 1, wherein the periodic transmission manager logic is to determine, based on the policy data, when periodic transmissions generated by the one or more applications are to be transmitted to the one or more network interfaces to cause a power state change, wherein the storage unit is to store one of: a policy database comprising the policy data or a log file comprising data corresponding to operations of the periodic transmission manager logic.

18. The method of claim 8, wherein transmitting the packet to the network interface is performed in response to a determination that the packet is to be transmitted to the network interface to cause a power state change, wherein the storage unit is to store one of: a policy database comprising the policy data or a log file comprising data corresponding to operations of the periodic transmission manager logic.

* * * * *